US008548220B2

(12) United States Patent
Bang et al.

(10) Patent No.: US 8,548,220 B2

(45) Date of Patent: Oct. 1, 2013

(54) APPARATUS FOR MEDIA RECOGNITION AND METHOD FOR MEDIA KIND DISTINCTION WITH THE SAME

(75) Inventors: Young-Sik Bang, Seongnam-si (KR); Seung-Oh Han, Seoul (KR)

(73) Assignee: LG CNS Co. Ltd., Seoul (KR)

( * ) Notice: Subject to any disclaimer, the term of this patent is extended or adjusted under 35 U.S.C. 154(b) by 852 days.

(21) Appl. No.: 12/597,778

(22) PCT Filed: May 15, 2008

(86) PCT No.: PCT/KR2008/002719

§ 371 (c)(1), (2), (4) Date: Oct. 30, 2009

(87) PCT Pub. No.: WO2008/140275

PCT Pub. Date: Nov. 20, 2008

(65) Prior Publication Data

US 2010/0135567 A1 Jun. 3, 2010

(30) Foreign Application Priority Data

May 15, 2007 (KR) ........................ 10-2007-0047264
May 29, 2007 (KR) ........................ 10-2007-0052132
May 29, 2007 (KR) ........................ 10-2007-0052236

(51) Int. Cl.
*G06K 9/00* (2006.01)

(52) U.S. Cl.
USPC ........... 382/135; 382/100; 382/137; 382/138; 382/181

(58) Field of Classification Search
None
See application file for complete search history.

(56) References Cited

U.S. PATENT DOCUMENTS 4,944,505 A 7/1990 Sherman, III
5,109,274 A * 4/1992 Washio et al. ................ 358/518
5,790,693 A 8/1998 Graves et al.
6,047,085 A * 4/2000 Sato et al. ...................... 382/165
6,188,787 B1 * 2/2001 Ohmae et al. ................. 382/165
6,516,078 B1 * 2/2003 Yang et al. ..................... 382/100
6,748,100 B2 * 6/2004 Herley et al. ................. 382/135

(Continued)

FOREIGN PATENT DOCUMENTS

CN 2184945 12/1994
CN 2510935 9/2002

(Continued)

OTHER PUBLICATIONS

Chinese Office Action for application No. 200880002051.0.

(Continued)

*Primary Examiner* — David Zarka
*Assistant Examiner* — Avinash J Yentrapati
(74) *Attorney, Agent, or Firm* — Lowe Hauptman & Ham, LLP

(57) ABSTRACT

Disclosed is a medium recognition apparatus for determining the type of a medium by using color information obtained by scanning the inserted medium, as well as a method for determining the type of a medium by using the apparatus. Color information and size information obtained by scanning only a partial region of a medium image, the hue of the medium image scanned by the image sensor, or RGB channel color information scanned by the color sensor is compared with pre-stored reference information to determine the type of the medium. This guarantees that the type of the medium is determined quickly and accurately based on simple comparing results.

7 Claims, 19 Drawing Sheets

(56) References Cited

U.S. PATENT DOCUMENTS

| | | | | |
|---|---|---|---|---|
| 6,970,602 | B1 * | 11/2005 | Smith et al. | 382/232 |
| 7,120,300 | B1 * | 10/2006 | Sankar | 382/190 |
| 7,303,134 | B2 * | 12/2007 | Ehrhart et al. | 235/486 |
| 7,978,365 | B2 * | 7/2011 | Nabeshima | 358/1.9 |
| 2003/0031342 | A1 * | 2/2003 | Sperl et al. | 382/100 |
| 2003/0231785 | A1 * | 12/2003 | Rhoads et al. | 382/100 |
| 2004/0165200 | A1 * | 8/2004 | Nabeshima | 358/1.9 |
| 2005/0127305 | A1 | 6/2005 | Androsyuk et al. | |
| 2005/0220339 | A1 * | 10/2005 | Kim | 382/165 |
| 2007/0165904 | A1 * | 7/2007 | Nudd et al. | 382/100 |
| 2008/0069423 | A1 * | 3/2008 | Liu et al. | 382/137 |
| 2008/0069427 | A1 * | 3/2008 | Liu et al. | 382/137 |
| 2008/0187217 | A1 * | 8/2008 | Okutsu et al. | 382/165 |
| 2010/0135567 | A1 * | 6/2010 | Bang et al. | 382/135 |
| 2010/0254600 | A1 * | 10/2010 | Kim | 382/165 |

FOREIGN PATENT DOCUMENTS

| | | |
|---|---|---|
| EP | 0779603 | 6/1997 |
| KR | 1019980014331 | 5/1998 |
| KR | 1020020026786 | 4/2002 |
| KR | 1020040090056 | 10/2004 |
| KR | 1020050009503 | 1/2005 |
| KR | 20-0394238 | 8/2005 |
| KR | 1020050111684 | 11/2005 |
| KR | 1020060019981 | 3/2006 |
| WO | WO9524691 | 9/1995 |
| WO | WO9948042 | 9/1999 |

OTHER PUBLICATIONS

International Search Report and Written Opinion for Application No. PCT/KR2008/002719, dated Oct. 24, 2008.

Supplementary European Search Report for EP08753515 dated Nov. 8, 2011.

European Office Action mailed Jul. 2, 2012 for European Patent Application No. 08753515.9.

Korean Office Action for 10-2007-0052236 dated Jun. 27, 2013, citing the above reference(s).

Korean Office Action for 10-2007-0052132 dated Jun. 27, 2013, citing the above reference(s).

* cited by examiner (c) (d)

(b) (e)

FIG. 12
| NEW/OLD NOTE | BANKNOTE TYPE | HUE |
|---|---|---|
| OLD NOTE | W10,000 NOTE | 50 ~ 100 |
| | W5,000 NOTE | 18 ~ 49 |
| | W1,000 NOTE | 0 ~ 17, 320 ~ 360 |
| NEW NOTE | W10,000 NOTE | 70 ~ 150 |
| | W5,000 NOTE | 0 ~ 50 |
| | W1,000 NOTE | 160 ~ 240 |
FIG. 13
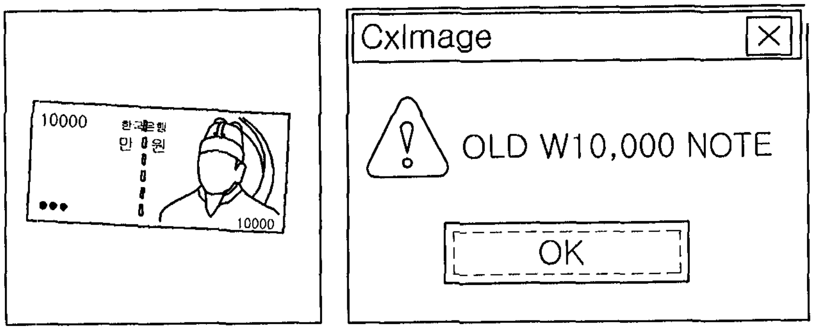
FIG. 14
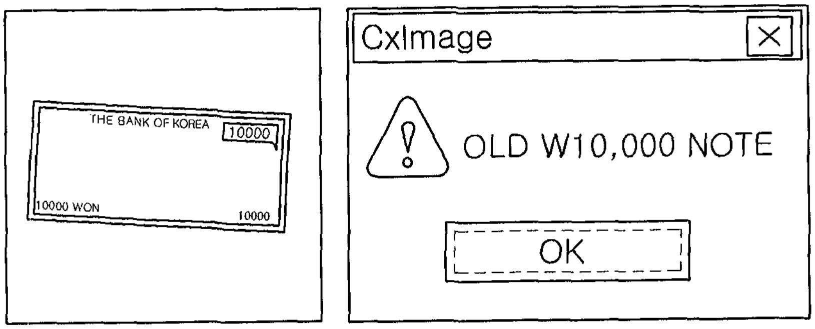

FIG. 29

| NEW/OLD NOTE | BANKNOTE TYPE | HUE |
|---|---|---|
| OLD NOTE | W10,000 NOTE | 50 ~ 100 |
| | W5,000 NOTE | 18 ~ 49 |
| | W1,000 NOTE | 0 ~ 17, 320 ~ 360 |
| NEW NOTE | W10,000 NOTE | 70 ~ 150 |
| | W5,000 NOTE | 0 ~ 50 |
| | W1,000 NOTE | 160 ~ 240 |

APPARATUS FOR MEDIA RECOGNITION AND METHOD FOR MEDIA KIND DISTINCTION WITH THE SAME

RELATED APPLICATIONS

This application is a 35 U.S.C. §371 national stage filing of PCT Application No. PCT/KR2008/002719 filed on May 15, 2008, which claims priority to, and the benefit of, Korean Patent Application No. 10-2007-0047264 filed on May 15, 2007, Korean Patent Application No. 10-2007-0052132 filed on May 29, 2007 and Korean Patent Application No. 10-2007-0052236 filed on May 29, 2007. The contents of the aforementioned applications are hereby incorporated by reference.

TECHNICAL FIELD

The present invention relates to a medium recognition apparatus. More particularly, the present invention relates to a medium recognition apparatus for determining the type of a medium and a method for determining the type of a medium by using the same.

BACKGROUND ART

As used herein, a medium refers to a banknote, a check, a thicket, a certificate, etc., the thickness of which is substantially smaller than the width or length.

Medium recognition apparatuses are used for various types of automated financial devices and medium handling devices, such as banknote recognition devices, vending machines, and coin exchangers, to recognize the magnetic, images, embedded images, fluorescent ink, numbers, and characters, which are printed on media, and determine the type of the media, whether they have been counterfeited or not, etc. The medium recognition apparatuses determine the type of media based on characteristic patterns peculiar to respective medium types.

FIG. 1 shows a series of steps of a method for recognizing the type of banknotes by using a banknote type recognition apparatus according to the prior art.

Referring to FIG. 1, in the first step (S1), the banknote recognition apparatus scans an image of a banknote by using an image sensor. The scanned image is generally larger than the banknote size to avoid scanning only a part of the banknote image due to vibration that may occur during the transfer process. Therefore, the scanned image includes both a banknote image and a marginal image around it.

In the second step (S2), the banknote recognition apparatus determines whether or not the banknote has been aligned. If the banknote is skewed, the skew is corrected. In the third step (S3), the banknote recognition apparatus extracts the banknote image by excluding the marginal image.

The banknote recognition apparatus then extracts the boundary lines of the banknote image (S4), and extracts the characteristic pattern of the banknote image (S5). As used herein, the characteristic pattern refers to the direction of boundary lines, end points, branch points, line values, etc. of a number of regions, into which the banknote image has been divided. The banknote recognition apparatus compares the extracted characteristic pattern with data regarding respective banknote types stored in the database (S6), and determines the type of the banknote (S7).

In order to extract the characteristic pattern, however, the banknote recognition apparatus must conduct complicated processes. Particularly, the apparatus scans an image, converts it into a filtered black/white image, and conducts additional digital filtering to create binary codes corresponding to the digital image. The binary codes are operated to identify the edge lines of the banknote. Then, the apparatus conducts quantization, conversion of the binary codes into vector tablets, coordinate rendering, etc. with regard to separate regions.

As such, the conventional banknote recognition apparatus relying on the characteristic pattern has a problem in that the algorithm for extracting characteristic patterns necessary to determine the banknote type is complicated, and the large number of processing steps slow down the operation.

In addition, use of the characteristic pattern of the image is vulnerable to vibration occurring while the banknote is transferred, noise of circuit devices, change in output of LEDs for illuminating the banknote, and variation in sensitivity of the image sensor.

The characteristic pattern of each banknote type must be stored in a database, which requires a large memory capacity.

If a color pattern scheme is adopted, the type of an inserted banknote is determined by emitting light to the front and rear surfaces of the banknote and identifying the shape of the banknote based on sensing data regarding the reflected or transmitted light. This scheme has a problem in that the banknote type can hardly be determined based on insufficient information, and it takes a long time to obtain the necessary data.

Schemes relying on fluorescent waves and UV rays have a problem in that the process of detecting fluorescent waves emitted from fluorescent substances is complicated and prolongs the operation.

Schemes employing size sensors to recognize banknotes have the problem of poor accuracy of determining the banknote type.

DISCLOSURE

Technical Problem

Therefore, the present invention has been made in view of the above-mentioned problems, and the present invention provides a medium recognition apparatus adapted to minimize the time necessary to determine the type of a medium and a method for recognizing the type of a medium by using the same.

The present invention also provides a medium recognition apparatus adapted to improve the accuracy of determining the type of a medium and a method for recognizing the type of a medium by using the same.

The present invention also provides a medium recognition apparatus adapted to minimize errors resulting from noise during a medium transfer process, change in output of LEDs, and variation in sensitivity of sensors and a method for recognizing the type of a medium by using the same.

Technical Solution

In accordance with an aspect of the present invention, there is provided an apparatus for recognizing a medium, the apparatus including a sensor unit for obtaining color information and size information regarding an inserted medium, and a determination unit for determining the type of the medium based on color information and size information regarding a banknote obtained from the sensor unit.

Preferably, the sensor unit includes a first sensor for obtaining color information from a partial region of the inserted banknote, and a second sensor for obtaining size information regarding the banknote.

Preferably, the first sensor is a color sensor, and the second sensor is an image sensor.

The apparatus further includes an extraction unit for extracting individual color information regarding an identical color from the color information, and a control unit for controlling the determination unit so as to determine the type of the medium with reference to at least two pieces of information selected from the extracted individual color information's size order and range information and size information regarding the medium.

Preferably, the individual color information is summation information regarding an identical color.

The sensor unit includes a color image sensor for scanning the entire region of the medium to obtain color information and size information regarding a scanned medium image.

The determination unit includes a skew correction unit for selectively correcting a skew when the inserted medium is skewed, a medium image extraction unit for extracting only a medium image after the skew of the medium has been corrected, and a medium size estimation unit for estimating the size of the medium from the extracted medium image and determining the type of the medium.

Preferably, the sensor unit includes a color sensor for scanning color information regarding the medium.

The determination unit includes a hue calculation unit for calculating a hue of an image scanned by the sensor unit, and a type determination unit for finally determining the type of the medium with reference to the calculated hue.

Preferably, the apparatus further includes a conversion unit for identically converting sensitivity for each channel of color information outputted from the sensor unit, and a calculation unit for calculating the skew, height, and hue of the medium based on the converted output signal, and the determination unit is adapted to determine the type of the medium by using the calculated height and hue.

The sensor unit includes at least two LEDs for emitting light to the medium, and at least two color sensors arranged side by side at a predetermined distance from each other to scan horizontally symmetric images of the medium reflecting the emitted light.

Preferably, the LEDs are white LEDs emitting white light so that color information of all RGB channels can be scanned.

Preferably, the apparatus further includes a storage unit for storing reference color information and size information regarding respective medium types, and the determination unit is adapted to compare color information and size information obtained from the sensor unit with the reference color information and size information stored in the storage unit, respectively, to determine the type of the medium.

In accordance with another aspect of the present invention, there is provided a method for determining the type of a medium by using a medium recognition apparatus, the method including the steps of scanning an image of an inserted medium, comparing color information and size information regarding the scanned medium image with pre-stored reference color information and size information, respectively, and determining the type of the medium according to the comparison result.

Preferably, the method further includes a step of extracting individual color information from a medium image obtained by scanning a predetermined region of the medium in the scanning step, and, in the comparing step, at least two pieces of information selected from the extracted individual color information's size order and range information and size information regarding the medium are compared.

Preferably, the individual color information is summation information regarding an identical color from the color information.

The scanning step includes the steps of obtaining color information regarding the medium image by using a color sensor, and obtaining size information regarding the medium by using an image sensor.

Preferably, in the scanning step, a color image sensor is used to scan the entire region of the medium and obtain color information and size information regarding the medium.

Preferably, the method further includes the steps of selectively correcting a skew of the inserted medium when the medium is skewed, and extracting only an image of the medium after the skew of the medium has been corrected.

Preferably, in the comparing step, size information regarding the medium estimated from only the extracted medium image is compared with the reference size information.

Preferably, the method further includes a step of calculating a hue of the medium from an RGB average value of the scanned medium image, and, in the comparing step, the calculated hue is compared with a pre-stored hue table for each medium type.

Preferably, in the scanning step, at least two color sensors arranged side by side to scan left and right surfaces of the medium, respectively, are used to scan the inserted medium.

Preferably, the method further includes the steps of identically converting sensitivity for each channel of color information outputted from the color sensors, and calculating determination data regarding the medium based on the converted output signal, and the calculated determination data is compared with pre-stored reference data in the comparing step.

Preferably, the calculating step includes the steps of calculating the skew of the medium generated during transfer based on the converted output signal, calculating the height of the medium by using the calculated skew and the difference between entry and exit time points of the medium, and calculating the hue of the medium based on the converted output signal.

Advantageous Effects

The present invention recognizes the type of a medium by detecting the size and color of the medium or by calculating the skew, height, and hue, and has the following advantages:

The operation according to the present invention is simple because not information regarding the front/rear surface of a banknote, but information regarding only a part of the banknote is used, or because hues calculated from RGB values of the banknote image are compared. Therefore, the system's processing speed is higher than conventional schemes of comparing various characteristic patterns or color patterns with data pre-stored in the database or those using fluorescent waves. In addition, a smaller amount of data is used to determine the banknote type.

The present determines the banknote type based on information regarding the color and size of a banknote image or its hue, regardless of the change in output of LEDs, the sensitivity of image sensors, vibration of the transfer module, and noise created from other circuit devices. This improves the accuracy and precision of banknote recognition.

The fact that only a part of various characteristics patterns, i.e. hue table, is stored in the memory reduces the necessary memory capacity and decreases the manufacturing cost.

As such, the present invention can determine the type of a medium quickly and accurately and improves the level of satisfaction.

BRIEF DESCRIPTION OF THE DRAWINGS

The foregoing and other objects, features and advantages of the present invention will become more apparent from the following detailed description when taken in conjunction with the accompanying drawings in which:

FIG. 12 shows a table enumerating hues for respective banknote types with regard to the apparatus shown in FIG. 10;

FIGS. 13-24 show exemplary display units displaying the result values of determining banknote types according to the method shown in FIG. 11;

FIG. 29 shows a table enumerating hues for respective banknote types with regard to the method shown in FIG. 28.

BEST MODE

Hereinafter, a medium recognition apparatus and a method for determining the type of a medium by using the same according to exemplary embodiments of the present invention will be described with reference to the accompanying drawings.

It is to be noted that, although banknotes are assumed as media in the following description of an embodiment of the present invention, the present invention is applicable to various types of medium recognition apparatuses for recognizing checks, commodity tickets, tickets, etc., which have specific images printed thereon.

In addition, although banknotes described herein refer to those which had been used (old notes) or which are currently in use (new notes) in the Republic of Korea, particularly W1,000 notes, W5,000 notes, and W10,000 notes (Won: Korean monetary unit), the present invention is applicable to banknotes of other nations.

Figure 1:
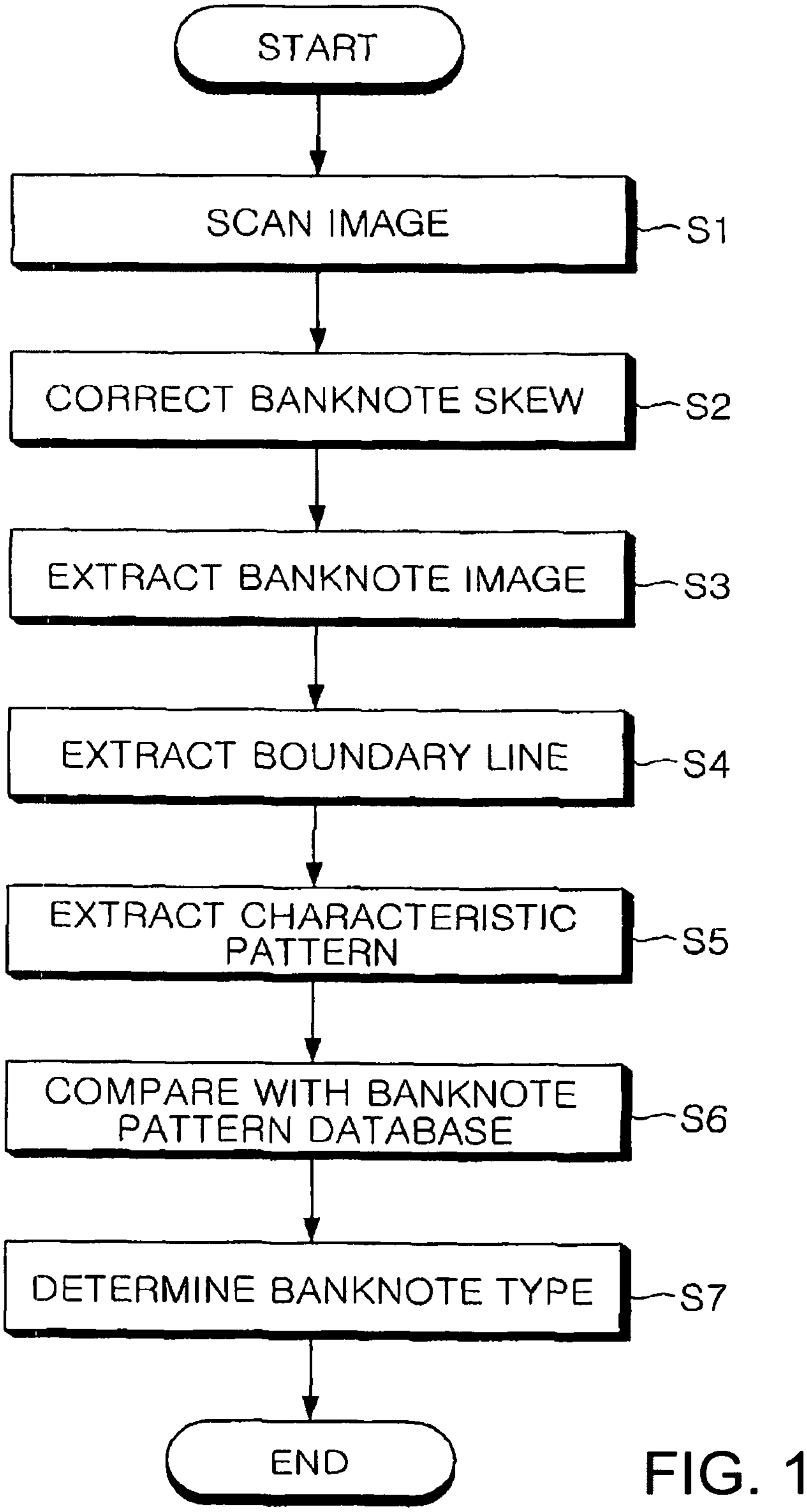
FIG. 1 (Prior Art)
FIG. 1 is a flowchart showing a method for determining the type of a banknote by using a conventional banknote recognition apparatus.
Figure 2:
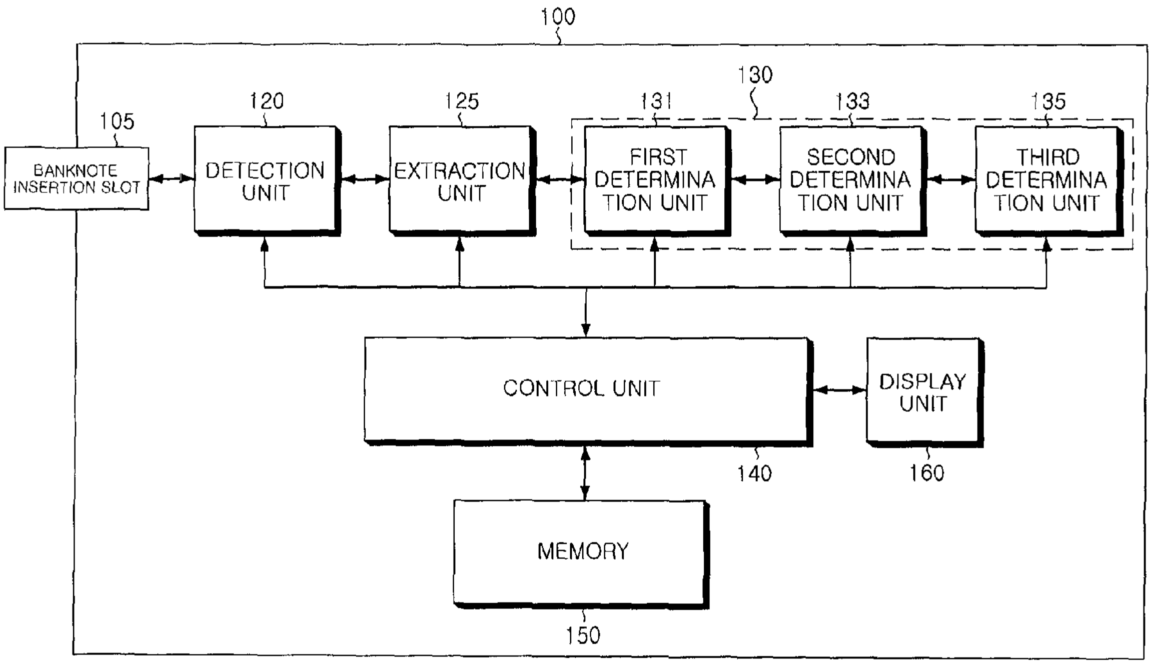
FIG. 2 is a block diagram showing the internal construction of a banknote recognition apparatus according to a first embodiment of the present invention.
Figure 3:
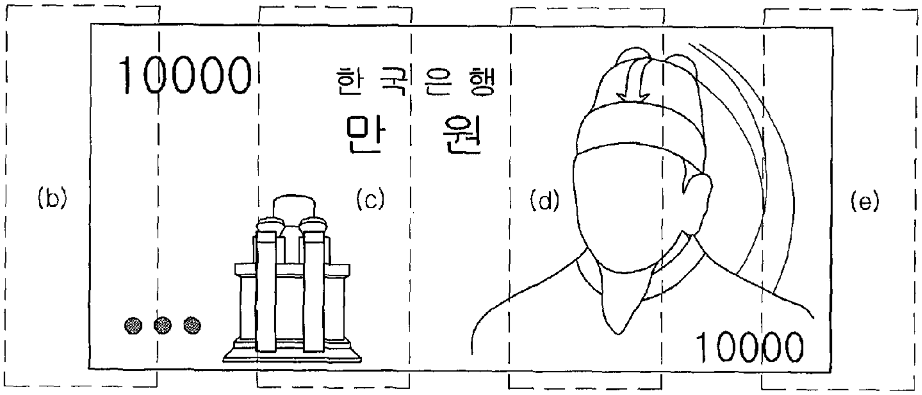
FIG. 3 shows exemplary banknote regions to be read by an image sensor according to the present invention.
Figure 4:
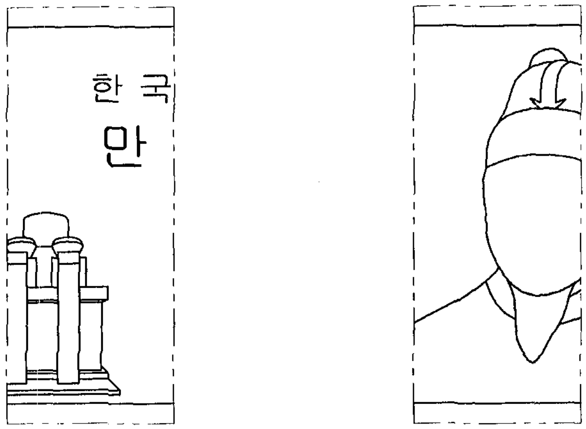
FIGS. 4 and 5 show exemplary information regarding the color of banknote regions (c) and (d) and information regarding the size of regions (b) and (e) obtained by the apparatus shown in FIG. 2.
Figure 5:
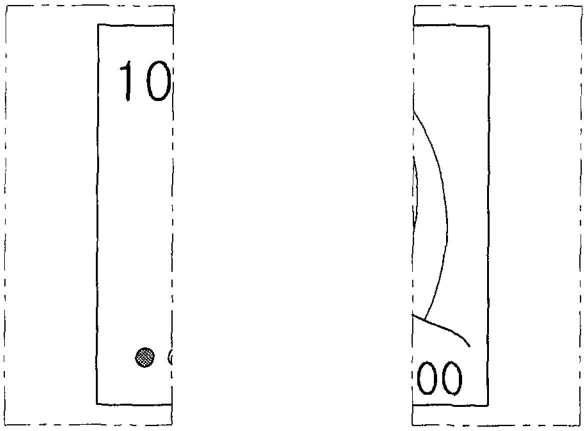

FIG. 2 is a block diagram showing the construction of a banknote recognition apparatus according to an exemplary embodiment of the present invention. FIG. 3 shows exemplary banknote regions to be read by an image sensor according to the present invention. FIGS. 4 and 5 show exemplary information regarding the color of banknote regions (c) and (d) and information regarding the size of regions (b) and (e) shown in FIG. 3.

It will be assumed in the following description of an exemplary embodiment of the present invention that, when the banknote recognition apparatus is provided with a banknote, the apparatus is supposed to determine the banknote as one of a W1,000 note, a W5,000 note, and a W10,000 note.

As shown in FIG. 2, the banknote recognition apparatus according to the present invention receives a banknote, which is inserted via a banknote insertion slot 105, to determine its type.

The apparatus has a detector for obtaining information regarding the color/size of a part of the banknote inserted via the banknote insertion slot 105 (hereinafter, referred to as an image sensor), in order to determine the banknote type. The image sensor 120 is adapted to obtain information regarding the color/size of only a part of the banknote, not the entire banknote, as image information for determining the banknote type.

Referring to FIG. 3, considering that the type of a banknote is determined based on color information and image information according to the present embodiment, the image sensor 120 obtains color information from regions (c) and (d) of the banknote, and obtains size information from regions (b) and (e) regions.

The reason size information is obtained from regions (b) and (e) while color information is obtained from regions (c) and (d) is that the banknote can be easily recognized by using these regions. Therefore, if other types of media (e.g. checks, tickets, certificates) are to be read, the designation and number of separate regions can be varied depending on characteristics of information regarding the color and size of respective media.

The image sensor 120 is adapted to sense predetermined portions, e.g. portions (b), (c), (d), and (e) shown in FIG. 3, and convert the sensing result into electrical signals, i.e. digital numerical information. A CCD (Charge-Coupled Device) is preferably used as the image sensor 120.

The apparatus has an extraction unit 125 for accessing the detected color information, extracting identical colors, and summing respective identical colors to extract individual color information (hereinafter, referred to as RGB information).

The extraction unit 125 obtains respective sum values of separate RGB or Red, Green, and Blue (hereinafter, referred to as RED SUM, GREEN SUM, and BLUE SUM). The extraction unit 125 compares respective calculated sum values (RED SUM, GREEN SUM, and BLUE SUM) one after another, and obtains order information based on the size of the RED SUM, GREEN SUM, and BLUE SUM values. In other words, the extraction unit 125 determines which of the RGB colors the inserted banknote includes the most. The order information is used by a first determination unit 131 in the determination step (described later). The step for obtaining the order information may also be conducted by the first determination unit 131 (described later).

The banknote recognition apparatus 100 according to the present invention has a memory 150 for storing information regarding the order of amounts of RGB colors contained in the same regions as regions (c) and (d) of respective banknote types (e.g. W1,000 notes, W5,000 notes, W10,000 notes), information regarding their ranges, and information regarding the size of respective banknote types. The stored information is used by a determination unit 130 (described later) to compare it with information extracted from the inserted banknote and determine the banknote type. The information is preferably tabulated and arranged for each inserted medium. The memory 150 may include various storage media, such as an EPROM, a flash memory, and an external memory, depending on necessary data storage capacity.

The apparatus 100 has a determination unit 130 for comparing the information regarding the order of RGB sizes, the range information, and the medium size information, which have been obtained by the extraction unit 125, with pre-stored each medium information to determine the banknote type.

The determination unit 130 includes a first determination unit 131 for primarily determining the type of the banknote with reference to the information regarding the order of RGB sizes extracted from regions (c) and (d) of the banknote, a second determination unit 133 for secondarily determining the type of the banknote with reference to each range information of the RGB information extracted from regions (c) and (d) of the banknote, and a third determination unit 135 for determining the type of the banknote with reference to the medium size information extracted from regions (b) and (e) of the banknote.

The first determination unit 131 accesses the information regarding the RGB order of regions (c) and (d) from the extraction unit 125, and compares the accessed information with RGB size order information for each medium stored in the memory 150 to determine the type of the inserted banknote.

More particularly, the first determination unit 131 receives RGB order information regarding regions (c) and (d) from the extraction unit 125.

The first determination unit 131 searches the memory 150, which stores RGB order information for each medium, to find information matching with the order information received from the extraction unit 125. If a banknote matching with the order information is found, it is primarily (temporarily) determined as the medium.

Following Table 1 shows information regarding the order of contained RGB amounts for each inserted medium, which is stored in the memory 150.

An exemplary primary determination of the type of a banknote will be described with reference to Table 1. If the first determination unit 131 receives order information 'GREEN SUM>RED SUM>BLUE SUM' from the extraction unit 125, the first determination unit 131 determines if any banknote type information among the information regarding the order of contained RGB amounts stored in the memory 150 matches with 'GREEN SUM>RED SUM>BLUE SUM'. If the RGB order information in the memory 150 is the same as given in Table 1, the first determination unit 131 primarily determines that the banknote is a W10,000 note because the stored RGB order information regarding W10,000 notes matches with the order information obtained by the extraction unit 125. If there is no matching value, the banknote is regarded as abnormal.

TABLE 1

| | |
|---|---|
| W10,000 note | green sum > red sum > blue sum |
| W5,000 note | red sum > green sum and green sum − blue sum < threshold |
| W1,000 note | red sum > green sum and green sum − blue sum < threshold |

The information regarding the order of contained RGB amounts may be the same among inserted media. In such a case, inserted media can not be easily recognized based on the RGB order information. An alternative approach according to the present invention will now be described on an assumption that the information regarding the order of contained RGB amounts is the same between W5,000 notes and W1,000 notes.

For example, W5,000 and W1,000 notes have the same RGB order information of 'RED SUM>GREEN SUM>BLUE SUM'. In this case, the difference between GREEN SUM and BLUE SUM of respective banknote types having the same RGB order information is calculated. If the difference is below a threshold, the banknote is determined as a W5,000 note, and if the difference is above the threshold, the banknote is determined as a W1,000 note. It is possible to vary the calculation target (which of RGB is to be calculated), the calculation method, and the threshold, which are necessary to distinguish inserted media when the RGB order information is the same, depending on the characteristics of RGB information for respective media.

It is obvious from the above description that, even if the RGB order information of two inserted media is the same, a parameter (threshold) can be used to compare the stored information with the information detected from the inserted banknote to distinguish different inserted media.

The second determination unit 133 receives RGB information from the extraction unit 125, and determines if each RGB information is included in the corresponding range information that has been stored in advance. If it is determined that all of the RGB information exists in the corresponding range information, the type of the medium is determined to be the same as the result of the primary determination.

TABLE 2

| | red color range | green color range | blue color range |
|---|---|---|---|
| W10,000 note | 25-30 | 45-50 | 15-20 |
| W5,000 note | 45-50 | 25-35 | 15-30 |
| W1,000 note | 55-65 | 25-35 | 5-15 |

The operation of the second determination unit 133 will now be described with reference to Table 2, which shows exemplary information regarding the range of contained RGB amounts stored in the memory 150.

Upon receiving a result of determination that the inserted banknote is a W1,000 note from the first determination unit 131, the second determination unit 133 accesses information regarding the range of contained RGB amounts of W1,000 notes stored in the memory 150.

Referring to Table 2, the RGB range information regarding W1,000 notes is as follows: the red color range is 55-65; the green color range is 25-35; and the blue color range is 5-15. The second determination unit 133 determines if the summed RGB information calculated by the extraction unit 125 is included in the range information. If so, the second determination unit 133 creates a result value of 'W1,000 NOTE CANDIDATE'. If any of each RGB information lies out of the range, the banknote is regarded as abnormal.

As mentioned above, the second determination unit 133 refers to the result of determination by the first determination unit 131 and secondarily determines the type of the inserted medium based on each RGB range information of the corresponding type.

The banknote recognition apparatus 100 includes a third determination unit 135 for referring to the result of determination by the second determination unit 133 and comparing the banknote size information stored in the memory 150 with the information regarding the size of regions (b) and (e) of the banknote detected by the image sensor 120 so that the type of the banknote is finally determined.

More particularly, upon receiving a result of determination that the inserted banknote is a W1,000 note from the second determination unit 133, the third determination unit 135 accesses information regarding the size of regions (b) and (e) of the banknote detected by the image sensor 120, and accesses information regarding the range of size of W1,000 notes stored in the memory 150. If the size information detected by the image sensor 120 lies within the size range information stored in the memory 150, the third determination unit 135 determines that the banknote is a W1,000 note. Otherwise, the banknote is regarded as abnormal.

The reason the third determination unit 135 can finally determine the type of the banknote based on the banknote size information is that respective banknotes (e.g. W1,000 notes, W5,000 notes, and W10,000 notes) have different sizes and that the image sensor 120 senses regions (b) and (e) and obtains digitalized numeric information, which can be used to distinguish different banknote types.

The banknote recognition apparatus 100 has a control unit 140 for controlling the overall operation of the apparatus. The control unit 140 may conduct the functions of the extraction unit 125, the first determination unit 131, the second determination unit 133, and the third determination unit 135. Alternatively, the control unit 140 may control at least two of the first to third determination units 131, 133, and 135 to determine the banknote type. In this case, the control unit 140 refers to information regarding the result of the first determination and then makes the next banknote type determination.

The banknote recognition apparatus 100 has a display unit 160 for outputting the final result of banknote type determination and processing steps. An LCD is generally used as the display unit 160.

It is obvious to those skilled in the art that, although an exemplary embodiment of the present invention has been described based on an assumption that the banknote recognition apparatus 100 determines which of a W1,000 note, a W5,000 note, and a W10,000 note the inserted medium corresponds to, the apparatus can determine the type of other media having different colors and shapes.

A method for determining the type of a banknote by using the banknote recognition apparatus, which determines the banknote type based on RGB information and size information regarding the banknote according to an exemplary embodiment of the present invention, will be described in detail.

Figure 6:
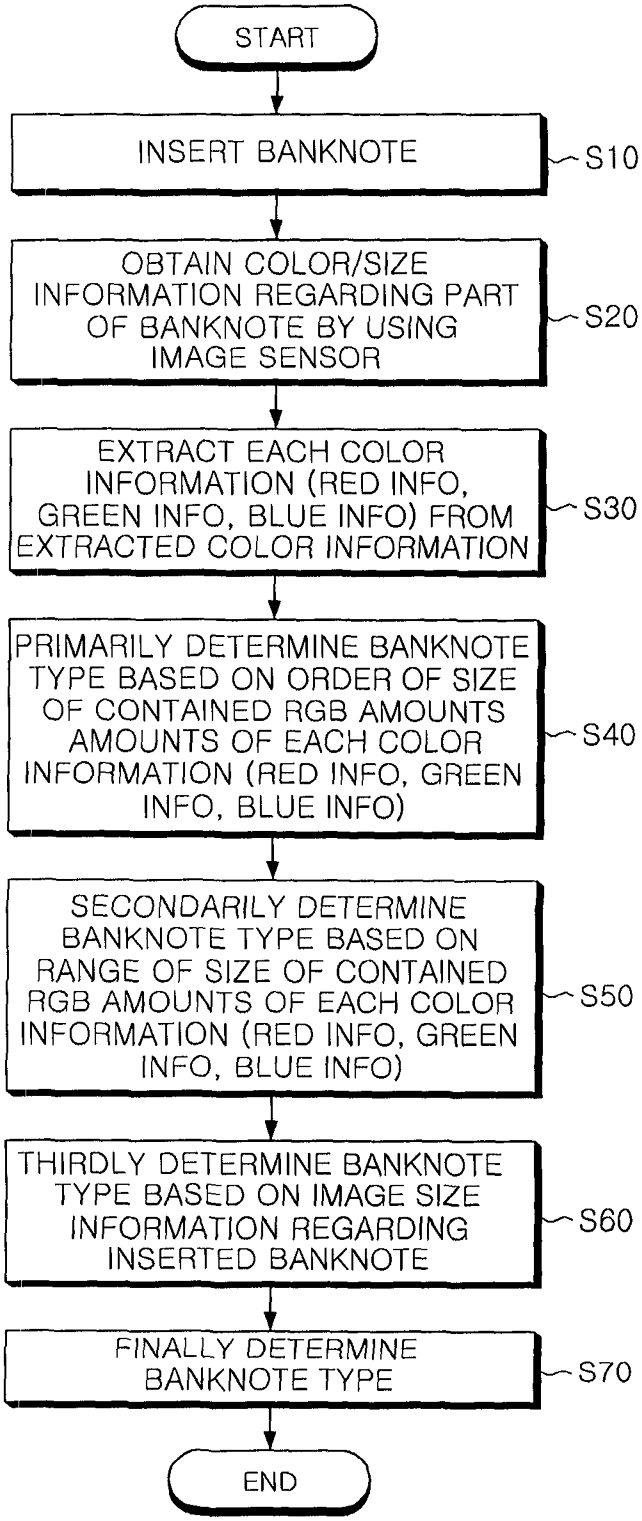
FIG. 6 is a flowchart showing a method for determining the type of a banknote by the apparatus shown in FIG. 2.
Figure 7:
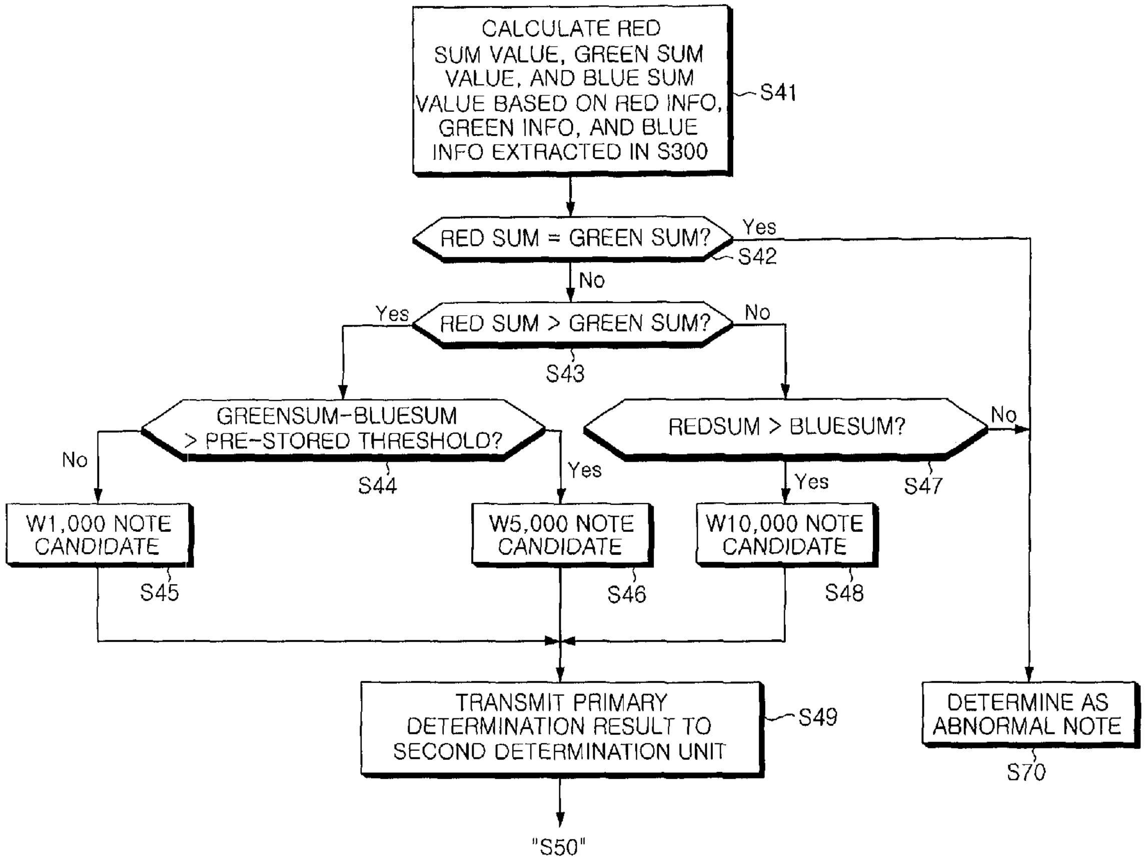
FIG. 7 is a flowchart showing in detail step S40 of the method shown in FIG. 6.
Figure 8:
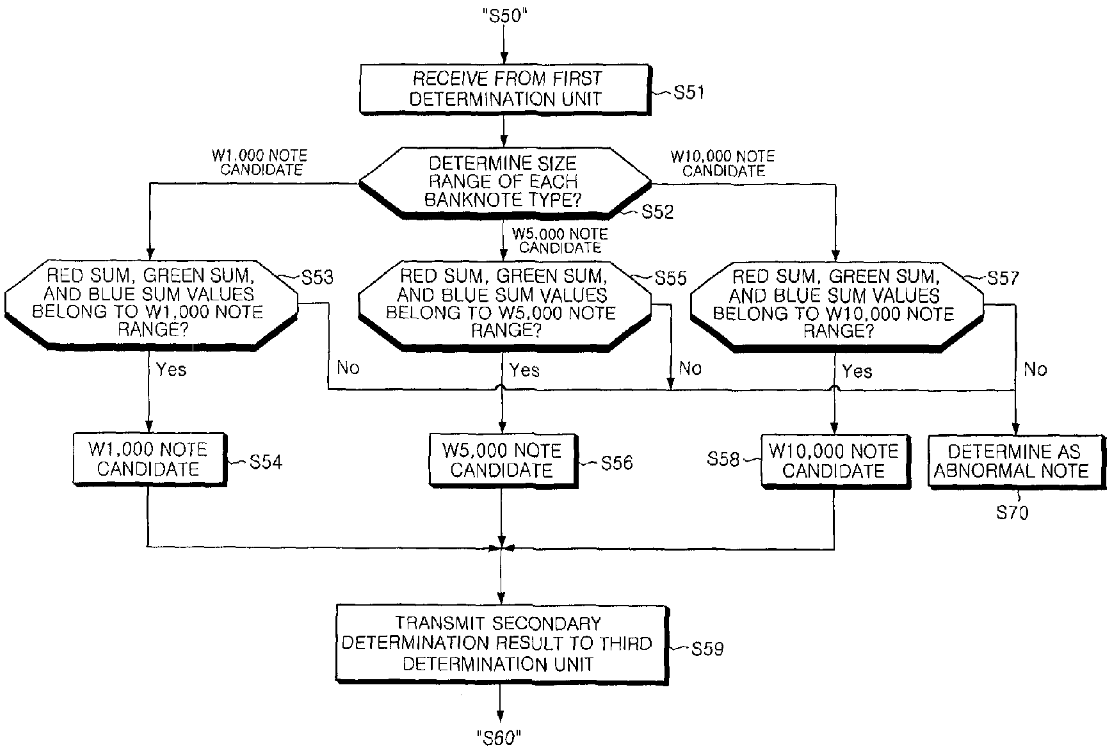
FIG. 8 is a flowchart showing in detail step S50 of the method shown in FIG. 6.
Figure 9:
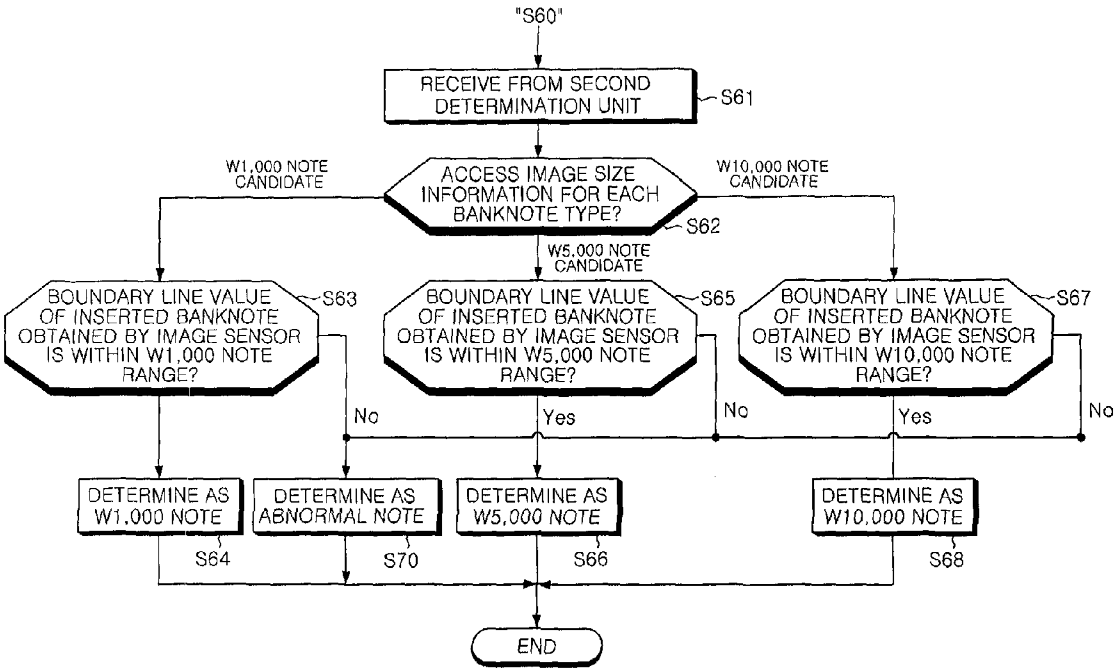
FIG. 9 is a flowchart showing in detail step S60 of the method shown in FIG. 6.

The method will now be described with reference to FIG. 6, as well as FIGS. 7-9 showing respective determination steps in detail.

FIG. 6 is a flowchart showing a method for recognizing the type of a banknote according to an exemplary embodiment of the present invention. It will be assumed in the following description of an exemplary embodiment of the present invention that an inserted medium is determined as one of a W1,000 note, W5,000 note, and a W10,000 note.

If a banknote is inserted via the banknote insertion slot 105 (S10), the image sensor 120 senses a predetermined portion of the inserted banknote. The predetermined portion includes regions (c) and (d) for detecting colors, and regions (b) and (e) for detecting the banknote size. The regions (c), (d), (b), and (e) are shown in FIG. 3.

The image sensor 120 senses regions (c), (d), (b), and (e) to determine the type of the inserted banknote (S20), as mentioned above.

The extraction unit 125 receives color information from the image sensor 120, extracts identical colors from the information, and obtains individual color information (hereinafter, referred to as RGB information) as the summation information. The extraction unit 125 compares the size of the RGB summation information, i.e. RED SUM, GREEN SUM, and BLUE SUM, to obtain order information, which is used in the primary determination step.

The obtained order information is compared with RGB order information for respective banknote types to primarily determine the type of the inserted banknote (S40).

Step S40 will now be described in more detail with reference to FIG. 7.

Firstly, the extraction unit 125 determines if the RED SUM value is identical to the GREEN SUM value (S42). If these values are determined identical, the banknote is regarded as abnormal (S43). If the RED SUM value and the GREEN SUM value are determined different from each other, the extraction unit 125 determines which of the RED SUM value and the GREEN SUM value is larger (S44).

If it is confirmed that the GREEN SUM value is larger than the RED SUM value, the extraction unit 125 determines which of the RED SUM value and the BLUE SUM is larger (S47).

If it is confirmed in step S47 that the RED SUM value is larger than BLUE SUM value, the extraction unit 125 obtains RGB order information of ‘GREEN SUM>RED SUM>BLUE SUM’.

The first determination unit 131 accesses the obtained order information (i.e. ‘GREEN SUM>RED SUM>BLUE SUM’) and searches the memory 150 for corresponding information to primarily determine the type of the banknote. The memory 150 preferably stores information regarding the order of contained RGB amounts for respective banknote types, e.g. W10,000 notes: GREEN SUM>RED SUM>BLUE SUM. The information regarding the order of contained RGB amounts for respective banknote types will be described with reference to the above-mentioned Table 1.

The first determination unit 131 primarily creates a result value indicating that the inserted medium is a W10,000 note candidate with reference to Table 1, and transmits the result value to the second determination unit 133 (S48).

If the extraction unit 125 has determined in step S43 that the RED SUM value is larger than the GREEN SUM value, operation ‘GREEN SUM−BLUE SUM’ is conducted (S44) to compare the operation result with a threshold and recognize the inserted medium. If the result of operation ‘GREEN SUM−BLUE SUM’ is determined to be larger than a predetermined threshold stored in the memory 150, order information of ‘RED SUM>GREEN SUM AND GREEN SUM−BLUE SUM>THRESHOLD’ is obtained.

The first determination unit 131 searches the storage unit for order information identical to the order information obtained by the extraction unit 125. Then, the first determination unit 131 creates a result value of ‘W1,000 NOTE CANDIDATE’ (S45). If the result value is determined to be smaller than the threshold, a result value of ‘W5,000 NOTE CANDIDATE’ is created (S46). The result value created by the first determination unit 131 is transmitted to the second determination unit 133 for secondary determination of the banknote type (S49).

As mentioned above, the first determination unit 131 compares the RGB order information regarding predetermined regions of the banknote inputted from the extraction unit 125 with pre-stored order information and creates a primary result value of 'ABNORMAL NOTE', 'W1,000 NOTE CANDIDATE', 'W5,000 NOTE CANDIDATE', or 'W10,000 NOTE CANDIDATE'(S70).

The secondary determination process for secondarily determining the banknote type from the primary determination result with reference to the information regarding the range of the size of contained RGB amounts will now be described with reference to FIG. 8.

The second determination unit 133 refers to the result of determination by the first determination unit 131 and accesses pre-stored information regarding the range of contained RGB amounts for respective banknote types. The second determination unit 133 determines if respective RGB information obtained by the extraction unit 125 exists within the above range to secondarily determine the type of the banknote (S50).

The second determination unit 133 receives a result value of 'W1,000 NOTE CANDIDATE', 'W5,000 NOTE CANDIDATE', or 'W10,000 NOTE CANDIDATE' from the first determination unit 131 (S51).

The second determination unit 133 conducts different steps according to the result of determination by the first determination unit 131 (S52).

For a more detailed description, it will be assumed that the second determination unit 133 receives a result value of 'W1,000 NOTE CANDIDATE'. The second determination unit 133 receives a result value of 'W1,000 NOTE CANDIDATE' from the first determination unit 131. Then, the second determination unit 133 accesses information regarding the range of contained RGB amounts of W1,000 notes stored in the memory 150.

The second determination unit 133 determines if respective RGB information extracted by the extraction unit 125, i.e. individual RGB sum values, exist within the information regarding the range of contained RGB amounts stored in the memory 150 (S53).

The above-mentioned Table 2 will be referred to for the following exemplary description.

For example, the RGB range information regarding W1,000 notes stored in the memory 150 may be 'RED SUM: 55-65, BLUE SUM: 25-35, and GREEN SUM: 5-15'. The information regarding summation of respective RGB extracted by the extraction unit 125 may be 'RED SUM: 56, BLUE SUM: 30, and GREEN SUM: 12'. Now that respective RGB sum values exist within respective RGB size ranges stored in the memory 150, the first determination unit 131 can create a secondary determination result value of 'W1,000 NOTE CANDIDATE'(S54).

Similarly, upon receiving a determination result of 'W5,000 NOTE CANDIDATE' from the first determination unit, the second determination unit 133 accesses the information regarding the range of contained RGB amounts of W5,000 notes stored in the memory 150, as mentioned above, and determines if individual RGB summation information extracted by the extraction unit 125 exists within the pre-stored information regarding the range of contained RGB amounts (S55).

If it is confirmed as a result of the determination that the respective RGB summation information regarding the inserted banknote, i.e. individual sum values, exists within the information regarding the range of contained RGB amounts regarding W5,000 notes, a result value of 'W5,000 NOTE CANDIDATE' is created (S513). If any of the respective RGB sum values exists out of the stored range, the banknote is regarded as abnormal (S56).

If the second determination unit 133 has received a determination result of 'W10,000 NOTE CANDIDATE' from the first determination unit 131, the second determination unit 133 compares the RGB range information regarding W10,000 notes stored in the memory 150 with respective RGB sum values extracted by the extraction unit 125, as mentioned above (S57). If it is confirmed as a result of the comparison that the extracted RGB sum values exist within the stored RGB range information, the banknote is determined as a W10,000 note candidate (S515). Otherwise, the banknote is regarded as abnormal (S58).

The second determination unit 133 secondarily determines the banknote type based on the RGB range information and transmits the result value to the third determination unit (S59).

The third determination process for thirdly determining the medium type based on the second determination result with reference to the information regarding the size of the medium detected by the detection unit will now be described with reference to FIG. 9 (S60).

To be specific, the third determination unit 135 may receive one of result values of 'W1,000 NOTE CANDIDATE', 'W5,000 NOTE CANDIDATE', and 'W10,000 NOTE CANDIDATE' from the second determination unit 133 (S61).

The third determination unit 135 accesses values of sensing boundary portions of the banknote by the image sensor 120 to obtain information regarding the size of the banknote, i.e. sensing values of regions (b) and (e) shown in FIG. 3 (S62).

If the third determination unit 135 has received a result value of 'W1,000 NOTE CANDIDATE' from the second determination unit 133, the third determination unit 135 determines if the size information accessed from the image sensor exists within the information regarding the range of sizes of W1,000 notes stored in the memory 150 (S63).

If it is confirmed as a result of the determination that the sensing values are within the size range, the banknote is finally determined as a W1,000 note (S64). If the sensing values are out of the size range, the banknote is regarded as abnormal (S70).

The size range may be manipulated to allow only a case in which the detected size information exactly matches with the stored size information. It is also possible to manipulate the size range to allow a predetermined range of errors.

If the third determination unit 135 has received a result value of 'W5,000 NOTE CANDIDATE' from the second determination unit 133, the third determination unit 135 similarly accesses the information regarding the range of sizes of W5,000 notes stored in the memory 150 and compares the information with the sensing values detected by the image sensor (S65). If the detected size information exists within the size range information, the third determination unit 135 finally determines that the inserted banknote is a W5,000 note (S66). Otherwise, the banknote is regarded as abnormal (S70).

If the third determination unit 135 has received a result value of 'W10,000 NOTE CANDIDATE' from the second determination unit 133, the third determination unit 135 accesses pre-stored information regarding the range of sizes of W10,000 notes stored in the memory 150 and compares the information with the sensing values detected by the image sensor, which indicate the size (S67). If the detected information exists within the range, the third determination unit 135 finally determines that the inserted banknote is a W10,000 note (S68). Otherwise, the banknote is regarded as abnormal (S70).

Although an embodiment of the present invention has been described on an assumption that the inserted medium is determined as one of a W1,000 note, a W5,000 note, and a W10,000 note, the present invention is applicable to apparatuses and methods for scanning images of other media (e.g. checks, tickets, certificates) and recognizing them.

Although several exemplary embodiments of the present invention have been described for illustrative purposes, those skilled in the art will appreciate that various modifications, additions and substitutions are possible, without departing from the scope and spirit of the invention as disclosed in the accompanying claims.

MODE FOR INVENTION

A medium recognition apparatus and a method for recognizing the type of a medium by using the same according to a second embodiment of the present invention will now be described in detail with reference to the accompanying drawings.

Figure 10:
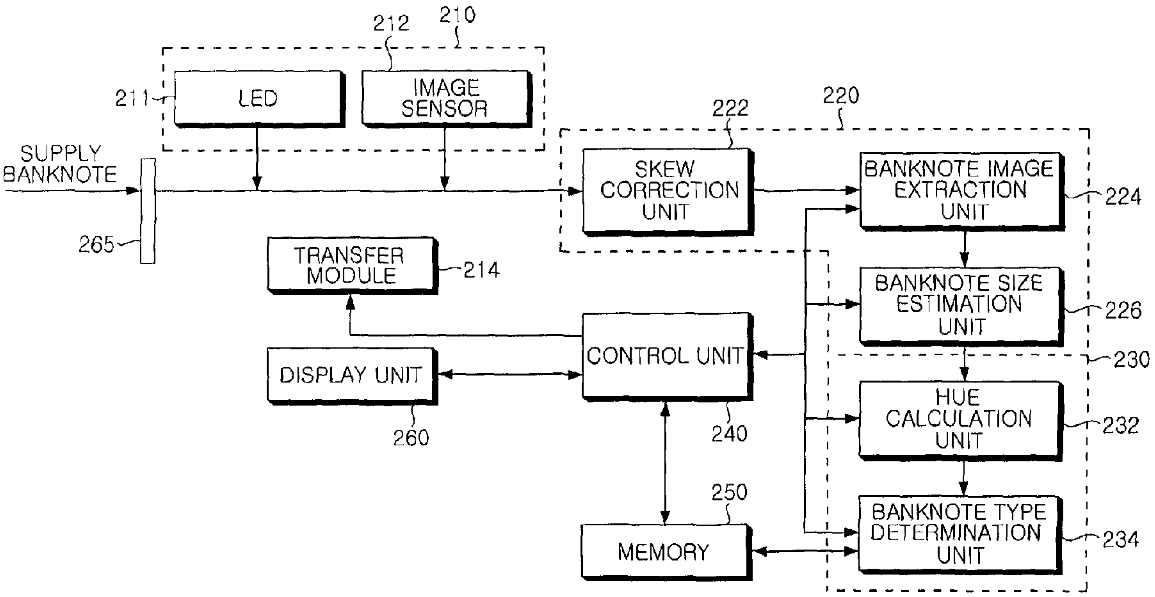
FIG. 10 is a block diagram showing the construction of a banknote recognition apparatus according to a second embodiment of the present invention.

FIG. 10 is a block diagram showing the construction of a banknote recognition apparatus according to an exemplary embodiment of the present invention.

As shown in FIG. 10, the banknote recognition apparatus according to the present invention receives a banknote inserted into the banknote insertion slot 205, which generates a signal upon sensing the inserted banknote.

The banknote recognition apparatus according to the present invention has an LED 211 for emitting light to the banknote, which is transferred in a predetermined direction (e.g. lateral direction) by a transfer module 214, when a banknote sensing signal is generated, and an image sensor 212 for scanning the banknote, which reflects the emitted light, to obtain a color image. The image sensor 212 scans a region larger than the size of the banknote in case the banknote is not inserted correctly due to vibration of the transfer module 214. As a result, the scanned image includes both a banknote image and a marginal image. The image sensor 212 outputs RGB values corresponding to the scanned banknote image. As the image sensor 212, a color image sensor, such as a charge-coupled device or a contact image sensor, is preferably used.

The apparatus has a first determination unit 220 for estimating the size of the banknote image scanned by the image sensor 212 and making a primary determination regarding the type of the banknote.

The first determination unit 220 has a skew correction unit 222 for correcting the skew if the banknote scanned by the image sensor 212 is not aligned horizontally. This is because the banknote may skew due to vibration of the transfer module 214. Those skilled in the art can easily understand that, if the banknote is transferred horizontally with no skew, the skew correction unit 222 does not conduct the skew correction operation.

The apparatus has a banknote image extraction unit 224 for removing the marginal image from the scanned image of the banknote, the skew of which has been removed or which has been transferred horizontally, to extract the banknote image only.

The apparatus has a banknote size estimation unit 226 for estimating the size of the banknote based on the extracted banknote image. The banknote size estimation unit 226 compares the estimated banknote size with data regarding the size of each banknote type stored in the memory 250 (described later) to primarily determine the banknote type. The banknote size estimation unit 226 can also distinguish between old and new notes, the format of which has been changed as of January, 2007.

The banknote recognition apparatus has a second determination unit 230 for calculating the hue of the banknote based on the RGB value and making a secondary determination regarding the type of the medium by using the hue.

The second determination unit 230 has a hue calculation unit 232 for calculating the hue (or simply H) of the banknote based on the outputted RGB value of the banknote image. The hue calculation unit 232 calculates the hue by using the following Equation 1 for converting the RGB value of the banknote image in the RGB coordinate system into one in the HSI (Hue-Saturation-Intensity) coordinate system. The RGB value is preferably the average RGB value of the banknote.

$$\theta = \cos^{-1}\left[\frac{\frac{1}{2}[(R-G)+(R-B)]}{(R-G)^2+(R-B)(G-B)^{\frac{1}{2}}}\right] \tag{1}$$

wherein, $H = \theta$ (if $B \le G$)

$H = 360 - \theta$ (if $B > G$)

The apparatus has a banknote type determination unit 234 for making a secondary determination regarding the banknote type by comparing the hue calculated by the hue calculation unit 232 with data regarding the hue of each banknote type stored in the memory 250.

The apparatus has a control unit 240 for comparing the primary determination of the banknote type made by the first determination unit 220 with the secondary determination of the banknote type made by the second determination unit 230 and deciding whether or not to normally terminate the banknote type determination operation. The control unit 240 refers to a CPU for controlling the overall operation of the banknote recognition apparatus. Under the control of the control unit 240, the transfer module 214 receives the banknote if the banknote type determination operation is normally terminated, and returns the banknote if the operation fails.

The memory 250 stores data regarding the size of each banknote type and hue data. The memory 250 may use the main storage device for storing various programs and data necessary to drive automated financial devices or other medium handling devices, including the banknote recognition apparatus.

The banknote recognition apparatus may further include a display unit 260 for displaying the result of determining the type of the inserted banknote and processing steps on the screen. An LCD is generally used as the display unit 260.

A method for determining the type of a banknote by using a banknote recognition apparatus according to an exemplary embodiment of the present invention will now be described in detail with reference to FIGS. 11, 12, and 13-24.

Figure 11:
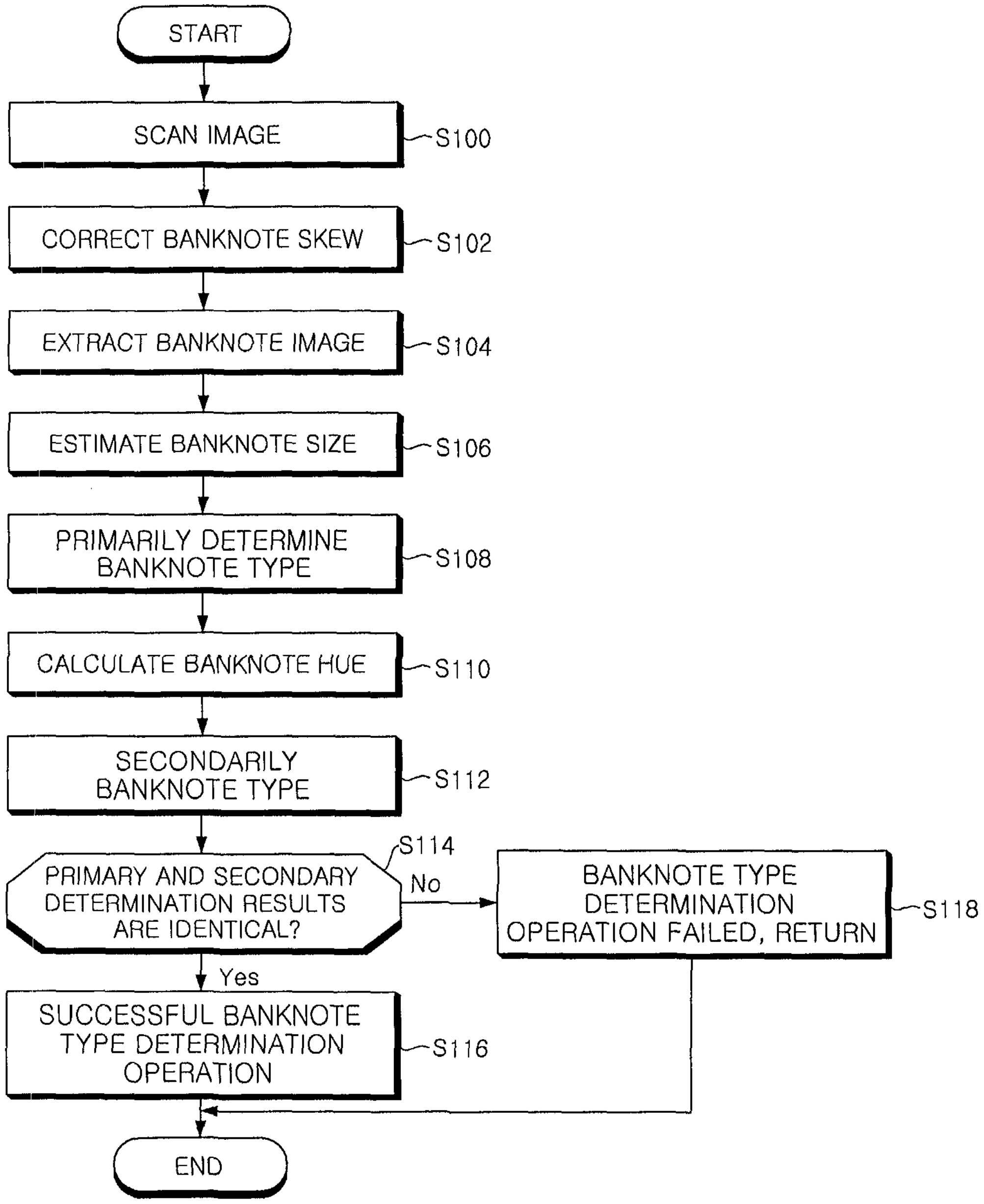
FIG. 11 is a flowchart showing a method for determining the type of a banknote by using the apparatus shown in FIG. 10.
Figure 15:
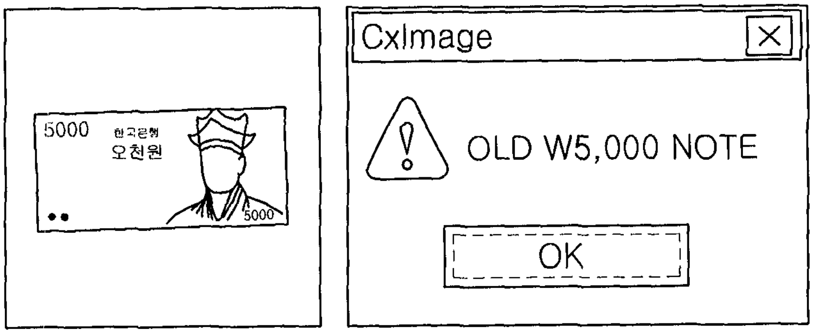
Figure 16:
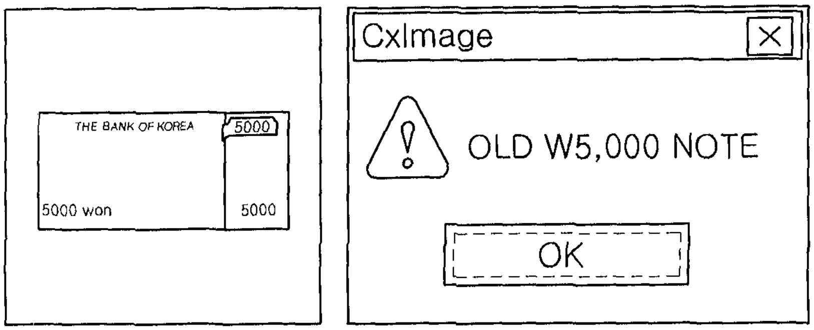
Figure 17:
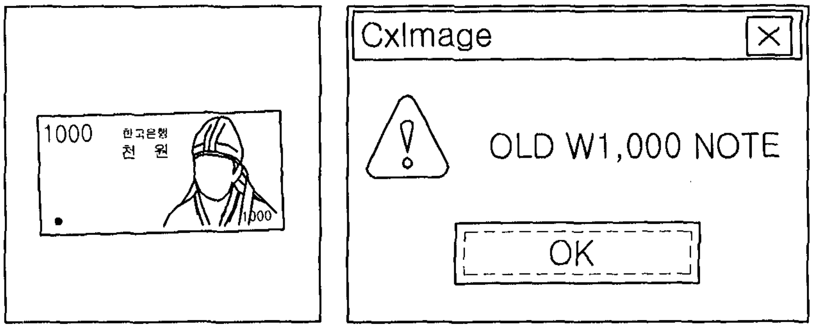
Figure 18:
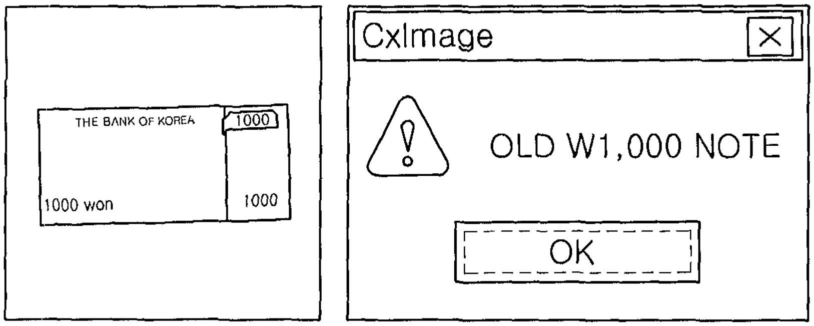
Figure 19:
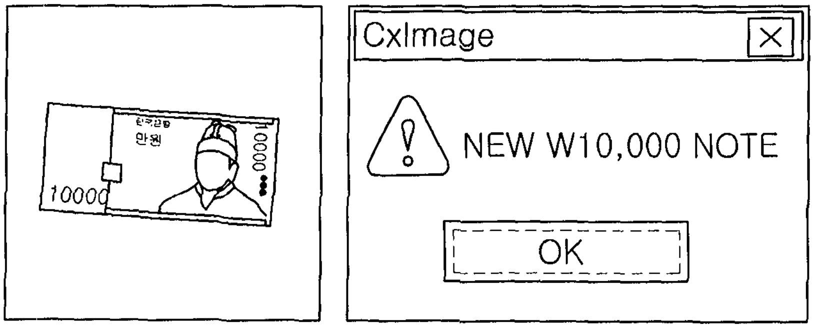
Figure 20:
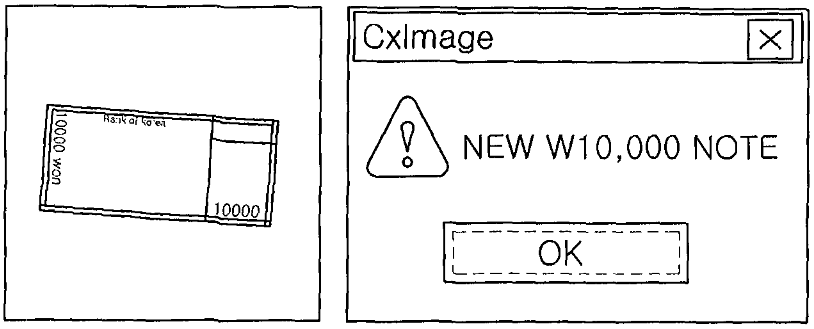
Figure 21:
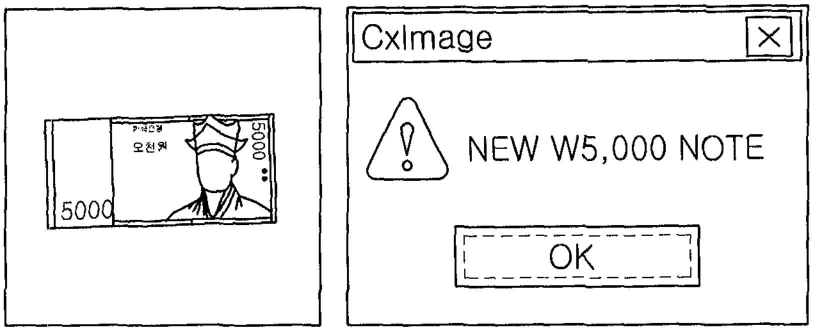
Figure 22:
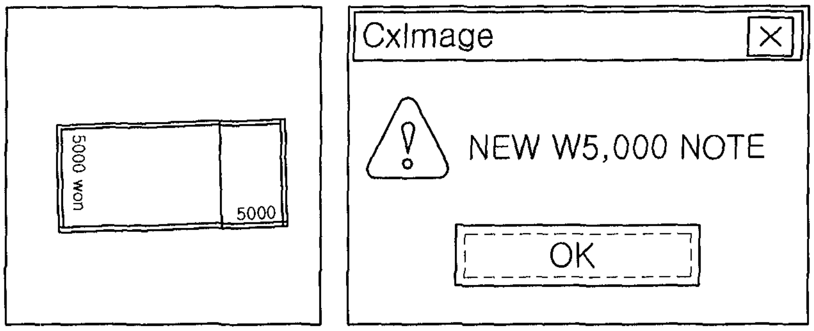
Figure 23:
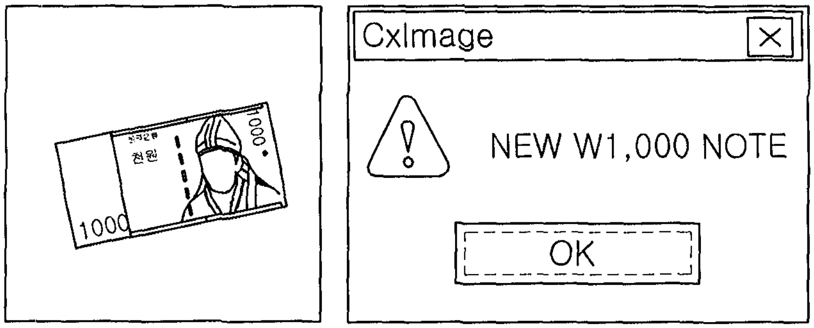
Figure 24:
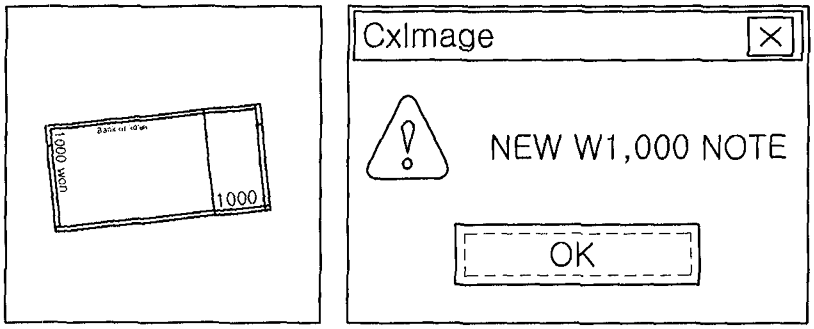

FIG. 11 shows a series of steps of the method for determining the type of a banknote by using the banknote recognition apparatus shown in FIG. 10. FIG. 12 shows a table enumerating the hue of each banknote type in connection with the method shown in FIG. 11. FIGS. 13-24 show exemplary display units displaying the results of determining banknote types according to the method shown in FIG. 11. The hue table is calculated according to the above-mentioned Equation 1, and is based on the average RGB value so that the same standards are applied regardless of whether the banknote is inverted or not and whether the front or back surface is shown.

A banknote is inserted and is transferred by the transfer module 214. Then, the LED 211 emits light to the inserted banknote under the control of the control unit 240 in step S100 (FIG. 11), and the image sensor 212 scans the banknote, which reflects the emitted light, to obtain a color image. The scanned image includes a banknote image and a marginal image. The scanned banknote image is outputted as an RGB value.

The skew correction unit 222 corrects the skew of the banknote if it has been skewed during the transfer due to vibration of the transfer module 214, for example, in step S102. This step is skipped if no skew has occurred.

The banknote image extraction unit 224 removes the marginal image from the image of the banknote, the skew of which has been corrected, to extract a banknote image (S104).

In following step S106, the banknote size estimation unit 226 estimates the size of the extracted banknote image and compares the estimated width and height of the banknote with data regarding the size of each banknote type stored in the memory 250. For example, new W10,000 notes issued as of January, 2007 have width×height sizes of 148×68 mm, and old notes have width×height sizes of 161×76 mm. Therefore, the banknote size estimation unit 226 according to the present embodiment determines if the extracted banknote height is smaller than 72 mm to differentiate between old and new notes. In addition, the width of the banknote is used to primarily determine the type of the banknote (S108). For example, new W10,000 notes have a width of 148 mm, new W5,000 notes have a width of 142 mm, and new W1,000 notes have a width of 136 mm. The banknote type can be determined based on these values.

However, the banknote type determined based on the banknote size has considerable errors due to vibration and noise from the transfer module 214 when transferring the banknote, change in the output of the LED 211, and change in the sensitivity of the image sensor 212. Therefore, a secondary determination operation is conducted based on the hue according to the present invention.

In step S110, the hue calculation unit 232 applies the average RGB value, which is outputted from the image sensor 212, to the Equation 1 to calculate the hue of the banknote.

In following step S112, the banknote type determination unit 234 compares the calculated hue with the data regarding the hue of each banknote type stored in the memory 250 to secondarily determine the type of the banknote.

It will be assumed for example that the banknote size estimation unit 226 has determined that the banknote is a new one in step S106 and that the average RGB value of the banknote outputted from the image sensor 212 is given the following Table 3.

TABLE 3

| color | R | G | B |
|---|---|---|---|
| average value | 175 | 195 | 173 |

The hue calculation unit 232 applies the RGB value to the Equation 1 to calculate a hue of about 115. Based on this, the banknote type determination unit 234 determines that the banknote is a new W10,000 note (70-150) with reference to the hue table shown in FIG. 12.

In step S114, the control unit 240 determines if the banknote type primarily determined by the banknote size estimation unit 226 is identical to the banknote type secondarily determined by the hue calculation unit 232. If so, the control unit 240 determines that the banknote type determination operation has been conducted successfully, and controls the transfer module 214 in the insertion direction of the banknote recognition apparatus so that the banknote is received (S26). Preferably, the display unit 260 displays FIG. 19 or 20, and the control unit 240 controls the transfer module 214 so that the banknote is classified according to the determined type and stacked.

If it has been determined as a result of the comparison that the primarily determined banknote type is different from the secondarily determined one, the control unit 240 determines that the banknote type determination operation has failed, and controls the transfer module 214 to return the banknote (S118).

As such, the banknote type is determined based on the size and hue of the banknote through the above-mentioned processes so that the banknote type determination operation is conducted quickly and accurately.

Although the above embodiment has been described with regard to banknotes, the present invention is also applicable to apparatuses and methods for recognizing other media (e.g. checks, tickets, certificates) by scanning their images.

To this end, the memory 250 may store data regarding the size of each medium type to be handled and a hue table so that the stored size and hue are compared with the obtained size and hue of the medium to determine the banknote type.

A banknote recognition apparatus according to a third embodiment of the present invention and a method for determining the type of a banknote by using the same will now be described with reference to the accompanying drawings.

Figure 25:
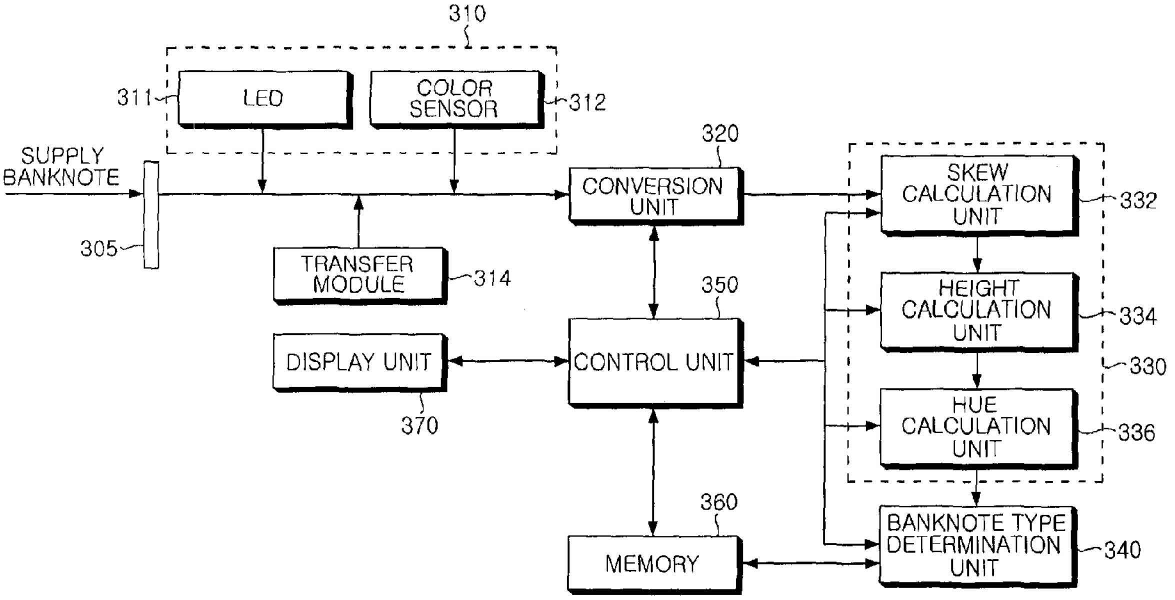
FIG. 25 is a block diagram showing the construction of a banknote recognition apparatus according to a third embodiment of the present invention.
Figure 26:
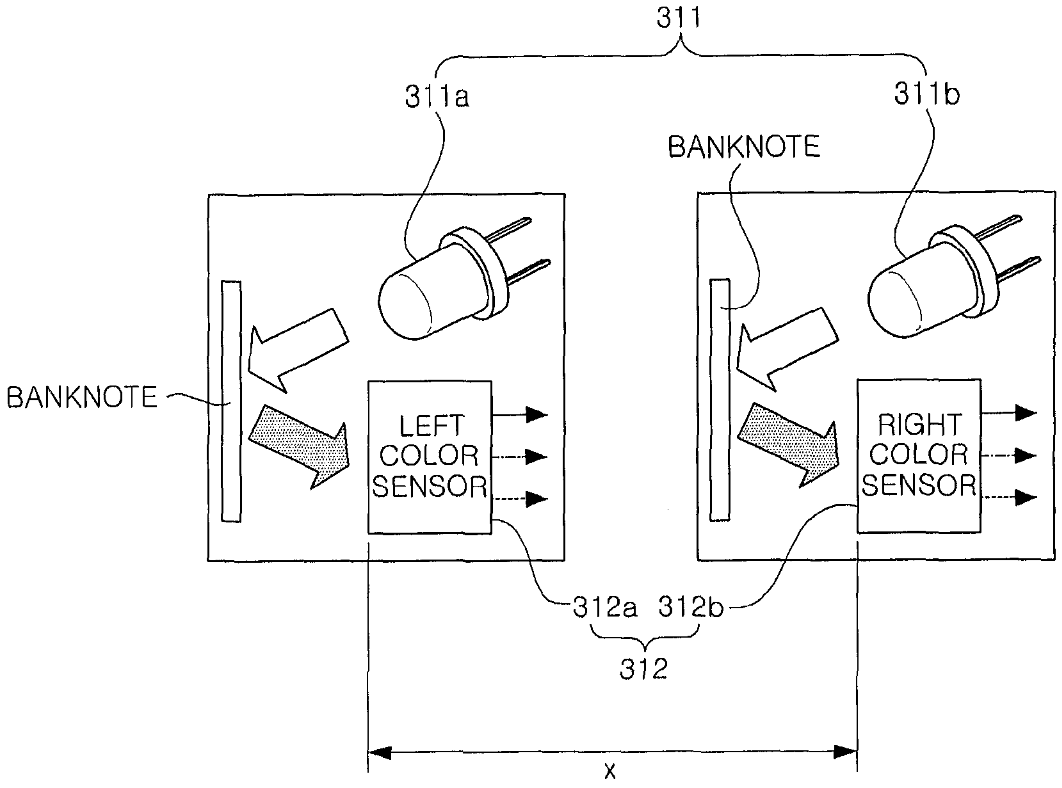
FIG. 26 shows the detailed construction of a sensing unit of the apparatus shown in FIG. 25.
Figure 27:
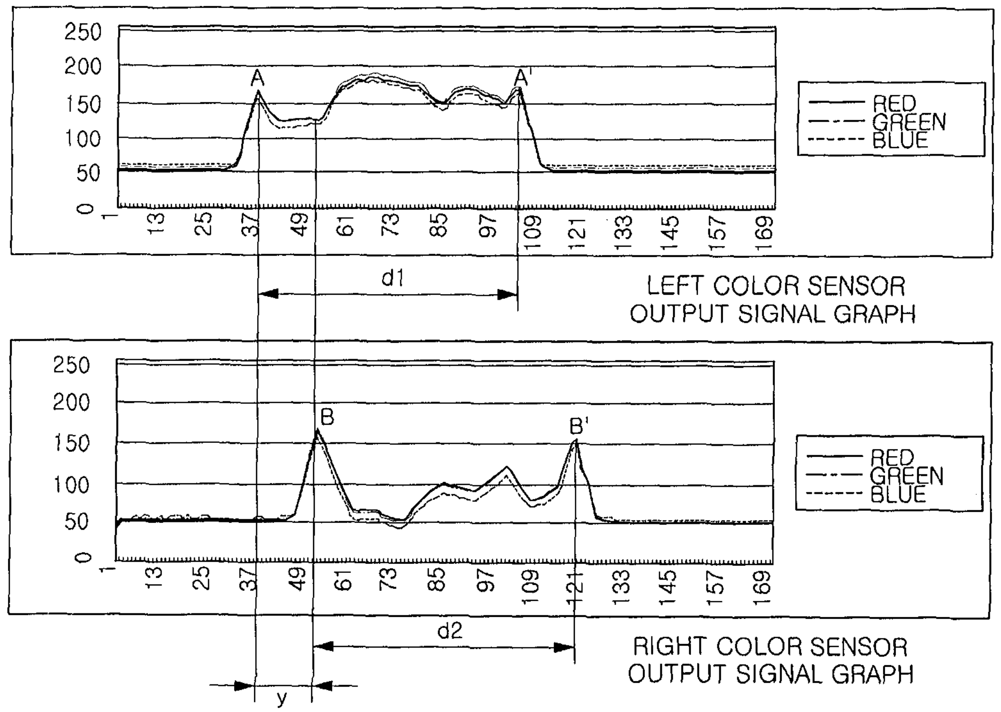
FIG. 27 show graphs of output signals outputted from a color sensor of the apparatus shown in FIG. 25.

FIG. 25 is a block diagram showing the construction of a banknote recognition apparatus according to a third embodiment of the present invention. FIG. 26 shows the detailed construction of a sensing unit of the apparatus shown in FIG. 25. FIG. 27 shows graphs of normalized signals outputted by left and right color sensors of the apparatus shown in FIG. 25.

As shown in FIG. 25, the banknote recognition apparatus according to the present invention receives a banknote inserted via the banknote insertion slot 305, which generates a signal upon sensing the inserted banknote.

The banknote recognition apparatus according to the present invention has a sensing unit 310 for scanning the banknote, which is transferred in a predetermined direction (e.g. lateral direction) by a transfer module 314, when the banknote sensing signal is generated.

The sensing unit 310 has an LED 311 for emitting light to the banknote and a color sensor 312 for scanning the banknote, which reflects the emitted light, to obtain its image.

As shown in FIG. 26, the color sensor 312 solely scans the color of the banknote and outputs the resulting color channel as an output signal, unlike the image sensor for scanning the banknote image (e.g. charge-coupled device or contact image sensor). To this end, the color sensor 312 includes two (left and right) color sensors 312*a* and 312*b* spaced from each other by a predetermined distance x (e.g. 55 mm) to scan regions of the banknote, which is inserted in the lateral direction, other than embedded images and lines. Although two color sensors are shown in FIG. 26, more than two color sensors may be used if necessary.

As shown in FIG. 27, the entry time points A and B of the banknote and the exit time points A' and B' thereof are identified based on the output signals from the left and right color sensors 312*a* and 312*b*. Based on these values, it is possible to obtain the difference (y) between the entry time points of the left and right surfaces of the banknote and the difference (d1=d2) between the entry and exit time points.

Preferably, the number and position of the LEDs 311 are determined to correspond to those of the color sensors 312*a* and 312*b* (e.g. two LEDs 311*a* and 311*b* arranged on the left and right sides) so that they emit light of at least a predetermined luminosity and that the color sensors 312*a* and 312*b* can easily scan desired regions. White LEDs 311 are used so that every color can be scanned.

The banknote recognition apparatus according to the present invention has a conversion unit 320 for converting signals outputted from the color sensor 312 so that the sensitivity of respective RGB channels of the color information is the same.

The apparatus also has a calculation unit 330 for calculating determination data, including skew, height, and hue, which is necessary to determine the type of the medium, by using the converted output signal.

The calculation unit 330 has a skew calculation unit 332 for calculating the skew θ of the medium by using the converted output signal. The skew calculation unit 332 calculates the skew by applying the positional difference x between the left and right color sensors 312*a* and 312*b* shown in FIG. 3, as well as the difference y between the entry time points of the left and right surfaces of the banknote show in FIG. 27, to the following Equation 2.

$$\Theta = \tan^{-1}\left(\frac{y}{x}\right) \tag{2}$$

The calculation unit 330 has a height calculation unit 334 for calculating the height h of the banknote based on the calculated skew θ and the entry-exit difference (d) of the banknote. The height calculation unit 334 calculates the height by applying the skew θ and the entry-exit time point difference d (d=d1=d2, sine the height of the banknotes is the same) to the following Equation 3.

$$h=d^{*}\cos\theta \tag{3}$$

The calculation unit 330 also has a hue calculation unit 336 for calculating the hue H of the banknote by averaging respective channel values of the color information. The hue calculation unit 336 calculates the hue H by applying the average value of each channel of the color information to the following Equation 4, which converts the value in the RGB coordinate system into one in the HSI coordinate system.

$$\theta = \cos^{-1}\left\{\frac{\frac{1}{2}[(R-G)+(R-B)]}{[(R-G)^2+(R-B)(G-B)]^{\frac{1}{2}}}\right\} \tag{4}$$

wherein, $$H=\theta \ (\text{if } B \le G)$$

$$H=360-\theta \ (\text{if } B > G)$$

The banknote recognition apparatus according to the present invention has a banknote type determination unit 340 for determining the type of the banknote by comparing the calculated height h and hue H of the banknote with banknote type determination data stored in the memory 360 (described later). The banknote type determination data includes data regarding the height for respective banknote types and a hue table.

The banknote recognition apparatus includes a control unit 350 for controlling the overall operation of the apparatus. The control unit 350 may conduct the functions of the conversion unit 320, the calculation unit 330, and the banknote type determination unit 340.

The apparatus also has a memory 360 for storing the banknote type determination data including height data for respective banknote types (e.g. W1,000 notes, W5,000 notes, and W10,000 notes) and a hue table. The banknote type determination data is preferably tabulated and arranged according to each type of the inserted banknote. As the memory 360, various storage media may be used, such as an EPROM, a flash memory, and an external memory, according to the necessary data storage capacity.

The apparatus has a display unit 370 for displaying the result of banknote type determination by the banknote type determination unit 340 and processing steps on the screen. An LCD is generally used as the display unit 370.

A method for determining the type of a banknote by using the banknote recognition apparatus according to the third embodiment of the present invention, which determines the banknote type based on the hue of the banknote, will now be described in detail with reference to FIGS. 28 and 29.

Figure 28:
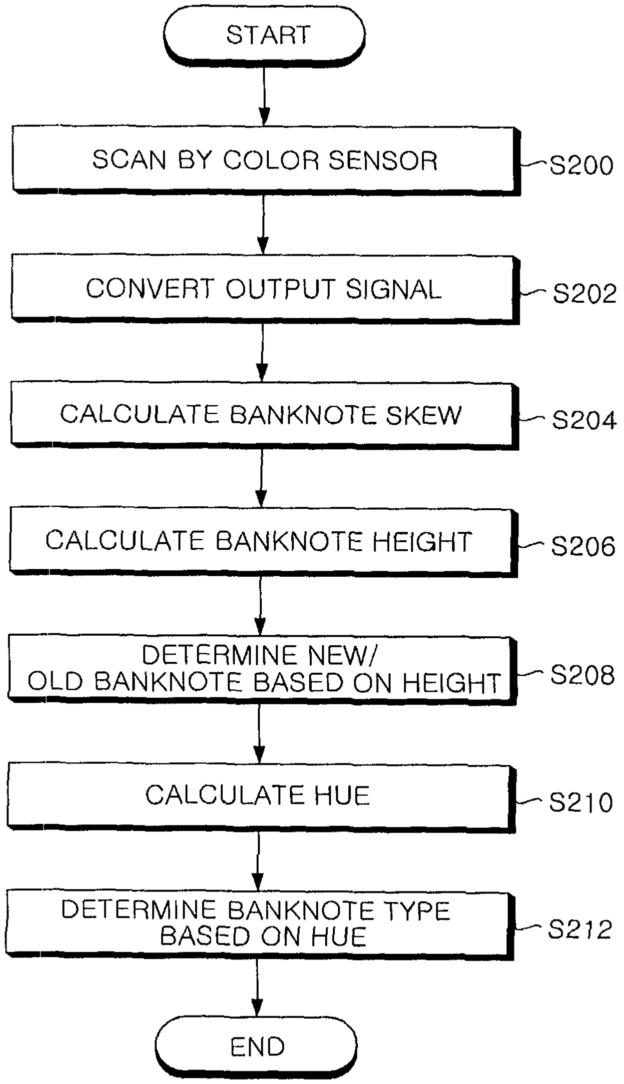
FIG. 28 is a flowchart showing a method for determining the type of a banknote by using the apparatus shown in FIG. 25.

FIG. 28 is a flowchart showing a series of steps of the method for determining the type of a banknote by using the banknote recognition apparatus according to the third embodiment of the present invention. FIG. 29 shows a hue table in connection with the method shown in FIG. 28. It will be assumed in the following description of an exemplary embodiment of the present invention that an inserted medium is determined to be one of a W1,000 note, a W5,000 note, and a W10,000 note.

A banknote is inserted into the banknote insertion slot 305 and is transferred by the transfer module 314. Then, the LED 311 emits light to the banknote under the control of the control unit 350 in step S200 shown in FIG. 28, and the left and right color sensors 312*a* and 312*b* scans the banknote, which reflects the emitted light, to obtain an image. The left and right color sensors 312*a* and 312*b* output color channels (RGB) based on the scanned image as output signals.

In step S202, the conversion unit 320 identically converts the sensitivity of respective channels of the color information. FIG. 27 shows color information graphs for respective channel converted in this manner. In the case of the color information outputted from the left and right color sensors 312*a* and 312*b* and converted, the banknote has been skewed by vibration during the transfer process and resulted in a difference (y=A−B) between the entry time point A of the left surface and the entry time point B of the right surface.

In step S204, the skew calculation unit 332 applies the position difference x between the left and right color sensors 312*a* and 312*b* and the difference y between the entry time points of the left and right surfaces of the banknote to the Equation 2 to calculate the skew θ of the banknote.

In step S206, the height calculation unit 334 applies the calculated skew θ and the entry-exit time point difference (d1=d2) of the banknote to the Equation 3 to calculate the height h of the banknote. The control unit 350 determines whether the banknote is a new note or an old note based on the calculated height h (S208). To be more specific, new notes issued as of January, 2007 have a height of 68 mm, while old notes have a height of 76 mm. Therefore, the control unit 350 determines that the banknote is an old note if the calculated height h is larger than the height data (e.g. 72 mm) for each banknote type stored in the memory, and that the banknote is a new note if the height is smaller than 72 mm.

In S210, the hue calculation unit 336 applies the average value for each channel of the normalized color information to the Equation 4, which converts the value in the RGB coordinate system into one the HSI system, to calculate the hue H of the banknote. The banknote type determination unit 340 compares the calculate hue H with the hue table for each banknote type stored in the memory to determine the type of the banknote (S212).

It will be assumed for example that the control unit 350 has determined in step S208 that the banknote is a new note and that the color channel average value of the banknote outputted from the color sensor 312 is given in the following Table 4.

TABLE 4

| color channel | R | G | B |
|---|---|---|---|
| average value | 175 | 195 | 173 |

The hue calculation unit 336 applies the average value of the color information for each channel to the Equation 3 to calculate a hue H of about 115. Based on this, the banknote type determination unit 340 determines that the banknote is a new W10,000 note (its hue is 70-150) with reference to the hue table shown in FIG. 29. The display unit 370 preferably displays the determined banknote type on the screen.

The control unit 350 then classifies the banknote, the type of which has been determined finally, according to the type and stacks it.

Through the above-mentioned processes, the present invention uses a color sensor to scan a banknote, the output signal of which is used to calculate the skew, height, and hue of the banknote and determine its type. As such, the banknote type determination operation is conducted quickly and accurately.

To this end, the memory may store height data for respective types of media to be handled and a hue table so that they are compared with the calculated height and hue of the medium to determine its type.

Although the second and third embodiments of the present invention have been described on an assumption that a color image sensor and a color sensor are used to detect color information of a medium, respectively, it is also possible to use both sensors simultaneously. In other words, the present invention may use both a color image sensor for detecting size information and a color sensor for detecting color information.

INDUSTRIAL APPLICABILITY

The medium recognition apparatus and the method for determining the type of a medium according to the present invention described above have the following advantages.

The present invention uses information regarding only a part of a banknote, not information regarding both front and rear surfaces of the banknote, or simply compares hues obtained from RGB values of the banknote image. Therefore, the present invention has a higher system processing speed and requires less data to determine the banknote type, compared with conventional methods of comparing various characteristic patterns or color patterns with data stored in the database or those relying on fluorescent waves.

The banknote type determination operation according to the present invention is based on the color information, size information, or hue of the banknote image, regardless of the change in the output of the LED, variation in the sensitivity of the image sensor, vibration of the transfer module, and noise from other circuit devices. This improves the precision and accuracy of banknote recognition.

The fact that only a part of various characteristics patterns, i.e. hue table, is stored in the memory reduces the necessary memory capacity and decreases the manufacturing cost.

Therefore, the present invention guarantees that the type of a medium is determined quickly and accurately, and improves the satisfaction of medium handling devices.

The invention claimed is:

1. An apparatus for recognizing a banknote, the apparatus comprising:
   - a sensor unit configured to obtain color information and size information regarding the banknote;
   - an extraction unit configured to extract individual color information from the color information regarding two or more predetermined color components;
   - a determination unit comprising a first determination unit configured to determine a type of the banknote based on an order of amounts of the individual color information regarding the two or more predetermined color components; and
   - a control unit configured to control the first determination unit,
   - wherein the determination unit further comprises:
   - a second determination unit configured to determine a type of the banknote according to a result from the first determination unit and a range of the individual color information regarding at least one of the two or more predetermined color components; and
   - a third determination unit configured to determine the type of the banknote according to a result from the second determination unit and the size information of the banknote.

2. The apparatus as claimed in claim 1, wherein the individual color information regarding one of the two or more predetermined color components is summation information of the one of the two or more predetermined color components.

3. The apparatus as claimed in claim 1, wherein the sensor unit comprises a color image sensor for scanning the entire region of the banknote to obtain color information and size information regarding a scanned banknote image.

4. The apparatus as claimed in claim 1, wherein the apparatus further comprises a storage unit for storing information regarding an order and ranges of amounts of color information contained in a region of a predetermined banknote type, and the size of the predetermined banknote type.

5. A method for determining the type of a banknote by using a medium recognition apparatus, the method comprising the steps of:
   - scanning the banknote to generate an image of the banknote;
   - identically converting sensitivity for each channel of color information outputted from color sensors;
   - calculating determination data regarding the banknote based on the converted output signal;
   - comparing the calculated determination data with prestored reference data; and
   - determining a type of the banknote according to the comparison result,
   - wherein the calculating step comprises the steps of:
   - calculating a skew of the banknote generated during transfer based on the converted output signal;
   - calculating a height of the banknote by using the calculated skew and the difference between an entry time point and an exit time point of the banknote; and calculating a hue of the banknote based on the converted output signal.

6. The method as claimed in claim 5, wherein, in the scanning step, the color sensors are arranged side by side to scan left and right surfaces of the banknote, respectively.

7. An apparatus for recognizing a banknote, the apparatus comprising:

a sensor unit for obtaining color information and size information regarding the banknote; and a determination unit for determining a type of the banknote based on color information and size information regarding the banknote obtained from the sensor unit, wherein the apparatus further comprises:

a conversion unit for identically converting sensitivity for each channel of color information outputted from the sensor unit; and a calculation unit for calculating a skew, height, and hue of the banknote based on the converted output signal, wherein the calculation unit comprises:

a skew calculation unit for calculating the skew of the banknote by using the converted output signal;

a height calculation unit for calculating the height of the banknote by using the calculated skew and the difference between an entry time point and an exit time point of the banknote; and a hue calculation unit for calculating the hue of the banknote based on the converted output signal.

* * * * *